United States Patent [19]

Nugier

[11] Patent Number: 4,674,163
[45] Date of Patent: Jun. 23, 1987

[54] APPARATUS FOR MANUFACTURE AND REPAIR OF TUBULAR PRODUCTS

[75] Inventor: John G. Nugier, Burns, Tenn.

[73] Assignee: Rockwell International Corporation, Pittsburgh, Pa.

[21] Appl. No.: 765,983

[22] Filed: Aug. 15, 1985

[51] Int. Cl.[4] ............................................. B23P 19/00
[52] U.S. Cl. ...................................... 29/33 T; 82/2.5; 228/48
[58] Field of Search ............... 29/56.6, 27 C, 27 A, 29/33 T, 27 R, 560.1; 228/48, 49.1; 82/3, 2.5; 269/55

[56] References Cited

U.S. PATENT DOCUMENTS

| | | | |
|---|---|---|---|
| 2,473,306 | 6/1949 | Schreiber | 82/25 |
| 2,753,826 | 7/1956 | Dougherty | 228/48 |
| 3,360,138 | 12/1967 | Gordon et al. | 228/49.1 |
| 3,758,098 | 9/1973 | Vrilakas | 267/55 |
| 3,827,121 | 8/1974 | Frederick | 29/56.6 |
| 4,457,193 | 7/1984 | Matthey | 82/3 |
| 4,589,371 | 5/1986 | Link et al. | 82/2.5 |

FOREIGN PATENT DOCUMENTS

| | | | |
|---|---|---|---|
| 52-33057 | 8/1977 | Japan | 228/40 |
| 126646 | 10/1979 | Japan | 228/48 |
| 60-3997 | 1/1985 | Japan | 228/49.1 |
| 284221 | 12/1970 | U.S.S.R. | 228/48 |

Primary Examiner—William R. Briggs

[57] ABSTRACT

Apparatus useful in the manufacture and repair of automotive drive shafts which includes a frame and an elongate support bed rotatably mounting a multiple jaw chuck for rotary movement, a generally cylindrical workpiece passage extending through the chuck and its bearings and a pedestal remote from the frame and mounting an additional workpiece support axially aligned with the chuck. Stringers rigidly connect the remote workpiece support to the frame and a plurality of devices are mounted and movable relative to the support bed for selectively effecting operations on one end of a tubular workpiece supported by the multiple jaw chuck with the other end of said tubular workpiece supported by the remote workpiece support mounted to the pedestal.

10 Claims, 13 Drawing Figures

APPARATUS FOR MANUFACTURE AND REPAIR OF TUBULAR PRODUCTS

BACKGROUND OF THE INVENTION

1. Field of the Invention.

The present invention is directed to apparatus useful in the manufacture and repair of tubular products and, more specifically, to apparatus for manufacturing and repairing tubular articles such as automotive drive shafts.

Automotive drive shafts sometimes referred to as drive lines are comprised of a tubular member having an element such as a yoke of a universal joint, a bearing stub or one component of a slip joint fitted at each end thereof. Such elements are usually pressed into the hollow interior of the tubular member and secured by a circumferential weld joint effected between the end of the tubular member and a surface of the inserted element.

In automotive applications, drive shafts are utilized, either singularly or in combination, as a torque transmitting component(s) of the power train and are most commonly located under the vehicle between the transmission or other gear box and the differential of a drive axle. The ends of the drive shaft are usually connected to other components of the power train by a yoke which is fitted to one end of the drive shaft and connected by means of a universal joint cross shaped journal to another yoke receiving or delivering torque from or to an adjacent component of the power train.

Torque transmitting drive shafts of this type, especially when employed on commercial vehicles and heavy duty trucks, are subject to sudden changes in torque and exposed to road hazards which, during the life of the vehicle, may cause wear or damage to the drive shaft. In the event of such wear or damage, the drive shaft may be removed and replaced in its entirely which is rather expensive. Depending upon the nature of the wear and/or damage incurred, the drive shafts may also be disassembled and repaired which is less expensive than replacing the unit, however, this option depends upon the availability of equipment necessary to disassemble and reassemble the drive shaft assembly.

2. Description of the Prior Art.

Various types of machinery and equipment such as lathes, vises, presses, cutting tools and welding devices have been employed to repair drive shafts in the past. these are general purpose devices and have usually been used to perform only a single function in the assembly and/or disassembly of driveshafts. Some of the equipment, for example, lathes and presses, are relatively expensive when used to perform only a single function. The assembly and disassembly of drive lines has also required high labor costs since the work pieces have traditionally been moved from one machine to another for each sequential operation and the drive shafts, some of which may be ten to twelve feet long, have to be set up for each separate operation.

One machine developed specifically for working on automotive drive shafts is disclosed in U.S. Pat. No. 3,758,098. That machine is similar to a lathe having a head stock and movable tail stock mounted to a relatively long support bed. The drive shaft is mounted between the tail stock and the head stock which includes a hydraulic jack. The machine disclosed by U.S. Pat. No. 3,758,098 requires an adaptor in the form of a U-joint yoke, a U-joint cross and a yoke on the drive shaft to mount the drive shaft or work piece in the machine. The machine is also relatively long and cumbersome considering that work is usually performed at only one end of the drive shaft at any one time.

The present invention avoids many of the problems presently encountered when attempting to assemble, disassemble, and/or repair tubular articles such as automotive drive shafts by providing a relatively small, compact work station capable of supporting a drive shaft with one end of the shaft located for the performance of several operations by a single operator with a minimum of movement required on the part of the operator. The machine enables a relatively unskilled operator to perform several operations with only a single "set up" of the drive shaft in the machine.

SUMMARY OF THE INVENTION

The present invention provides an apparatus for machining and fitting one end of an elongated tubular workpiece comprising a frame, an elongate support bed and bearing means rotatably mounting a multiple jaw chuck for rotary movement around a horizontal axis. The bearing means are rigidly secured at one end of the support bed and means for rotating the chuck are also provided. A generally cylindrical workpiece passage concentric with the horizontal axis extends through the chuck and the bearing means. A tool head is supported by a stanchion at the other end of the support bed, and is mounted for reciprocating movement along the horizontal axis. A laterally moveable tool fixture is also mounted for movement along one horizontal edge of the support bed between the multiple jaw chuck and the stanchion whereby the multiple jaw chuck, the tool head and the tool fixture may be selectively actuated to operate on one end of a tubular workpiece supported by the chuck in the workpiece passage with one end of the workpiece located on one side of the multiple jaw chuck between the multiple jaw chuck and the stanchion and the other end of the workpiece disposed on the other side of the multiple jaw chuck.

In the preferred embodiment the tool head is a vise fixed to a piston of a hydraulic cylinder supported by the stanchion, and the apparatus also includes means for withdrawing elements previously fitted to one end of the tubular workpiece.

The means for withdrawing elements previously fitted to one end of the tubular workpiece is preferably in the form of an additional chuck assembly movably mounted to the support bed and movable from a position displaced from the multiple jaw clutch to a position adjacent the multiple jaw chuck with the jaws of the additional chuck assembly concentric with the horizontal axis.

The additional chuck assembly also includes means for engaging the jaws of the additional clutch assembly with an element previously fitted to the one end of the tubular workpiece and means for moving the jaws of the additional clutch assembly and said element axially away from the end of the tubular workpiece.

In the preferred embodiment a pedestal is also provided, remote from the frame and mounting workpiece support means axially aligned with the chuck to support the remote end of the workpiece and means are also provided to rigidly connect the remote article support means to the frame.

These and other features and advantages of the invention will become apparent from the following detailed description of the embodiment shown by the accompanying drawings.

BRIEF DESCRIPTION OF THE DRAWINGS

In the drawings, wherein like reference numerals refer to like parts.

DESCRIPTION OF THE PREFERRED EMBODIMENT

Figure 1:
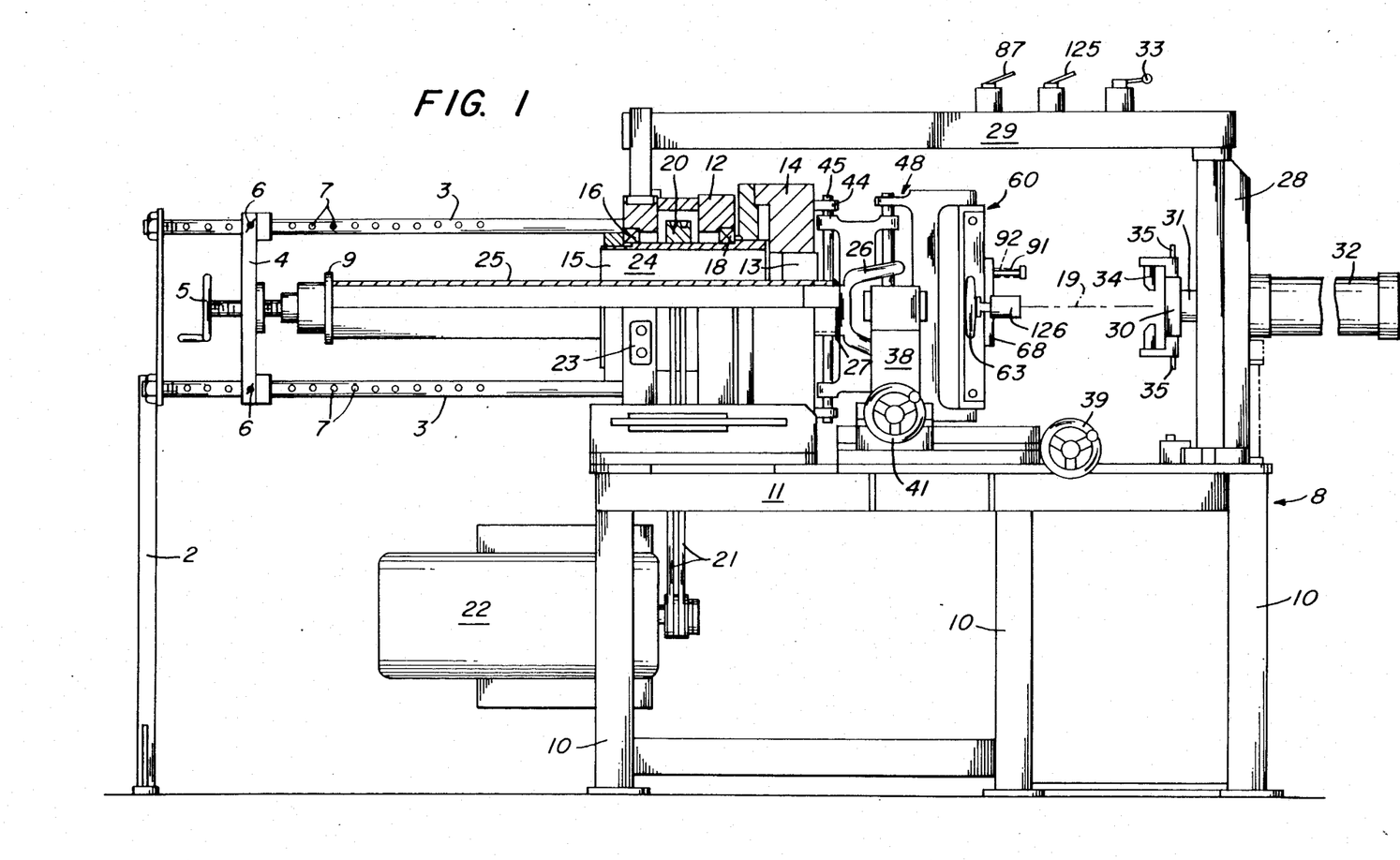
FIG. 1 is a side view, partly in section of the apparatus according to the present invention.
Figure 2:
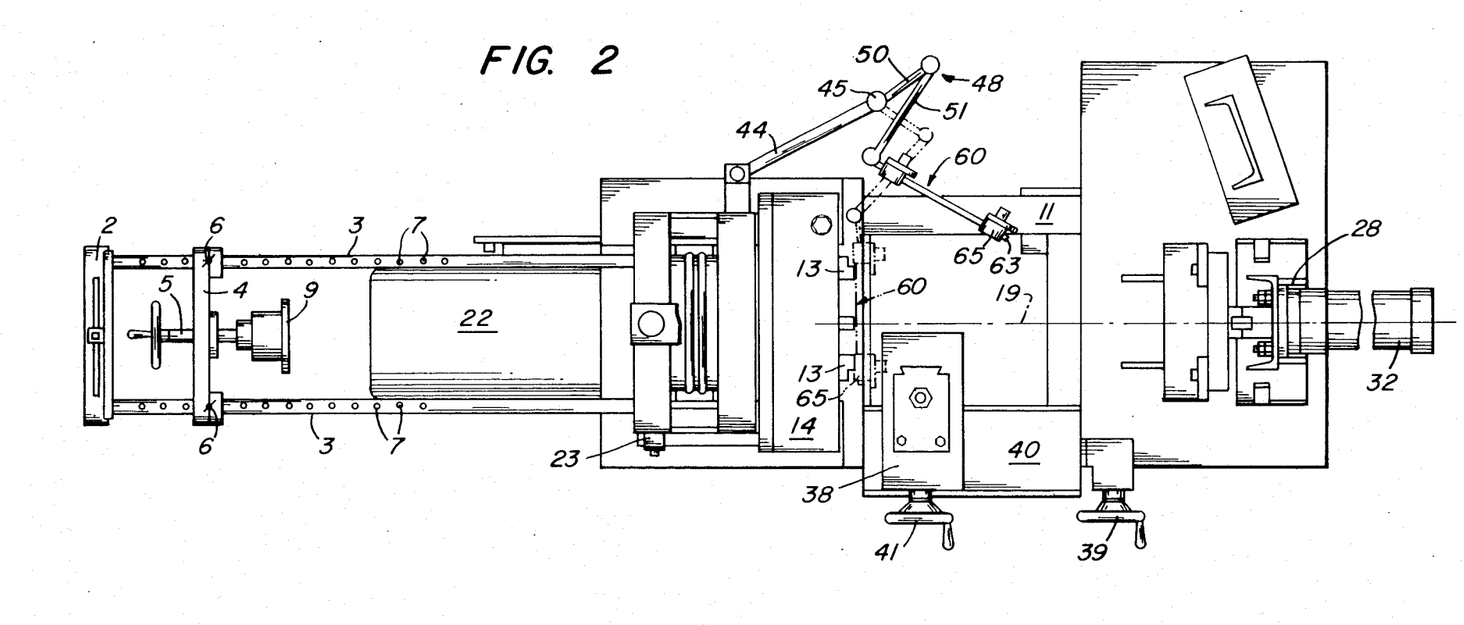
FIG. 2 is a plan view of the apparatus of FIG. 1.

With reference to the drawings, FIGS. 1 and 2 in particular, there is shown a frame 8 comprised of a plurality of legs 10 and an elongate support bed 11. A housing 12 secured to the support bed 11 rotatably mounts a multiple jaw chuck 14 and a hollow cylindrical sleeve 14 on bearings 16 and 18 for rotation about a horizontal axis 19. Rotary movement of the sleeve 15 and multiple jaw chuck 14 is provided by means of a sheath 20 secured to the sleeve 15 and receiving a pair of V-belts 21 driven by motor 22. The multiple jaw chuck 14 includes a plurality of jaws 13, three are employed in the preferred embodiment and are spaced equidistantly around horizontal axis 19. The space between the jaws 13 and the hollow cylindrical sleeve 15 provides a generally cylindrical passage 24 for receiving the work piece such as, for example, a hollow tubular drive shaft 25.

A pedestal 2 remote from the frame 11 supports one end of a pair of cylindrical stringers 3 which are secured at their opposite ends to the housing 12. The stringers 3 slidably mount a workpiece support bar 4. The support bar 4 can be selectively positioned at various locations along the stringers 3 by means of a pair of pins 6 which engage a selected pair of plurality of holes 7 provided diametrically through the stringers 3. The support bar 4 is threaded at a central location aligned with the horizontal axis 19 and serves as a nut for hand crank operated power screw 5 having a plate 9 for supporting the remote end of the driveshaft workpiece 25.

The plate 9 can be adjusted to support the remote end of any tubular workpiece within the limits of the length of stringers 3 by moving the support bar 4 to the appropriate pair of holes 7 and adjusting the handcrank and power screw 5 to locate the plate 9 in abutment with the remote end of the workpiece.

An upright stanchion 28 is secured to the end of the support bed 11 opposite from the housing 12 and multiple jaw chuck 14. The stanchion 28 provides support for an upper frame member 29 secured at its opposite end to the fabricated housing 12. Frame member 29 also supports three control boxes with actuating levers 33, 87 and 125 for actuating and controlling hydraulic cylinders to be described herebelow. The stanchion 28 also supports a tool head 30 fixed to the end of a piston of a hydraulic cylinder 32 secured to the stanchion 28. A vise 34 having a plurality of jaws actuated by means of quick release keys 35 is mounted to the tool head 30.

A tool fixture 38 is mounted for movement by means of a first hand wheel 39 along a track 40 secured to a horizontal edge of the support bed 11 between the multiple jaw chuck 14 and the stanchion 28. The tool fixture 38 is also movable laterally across the support bed 11, i.e., toward and away from the horizontal axis 19 by means of a second hand wheel 41. The hand wheels 39 and 41 respectively drive power screws arranged for moving the tool fixture carriage and the tool fixture 38 to a desired work location in a convention manner.

A bracket 44 secured to the housing 12 is cantelivered to the rear of the apparatus as shown by FIG. 1 and by means of a pin 45 pivotally mounts a double swing arm assembly 48.

Figure 3:
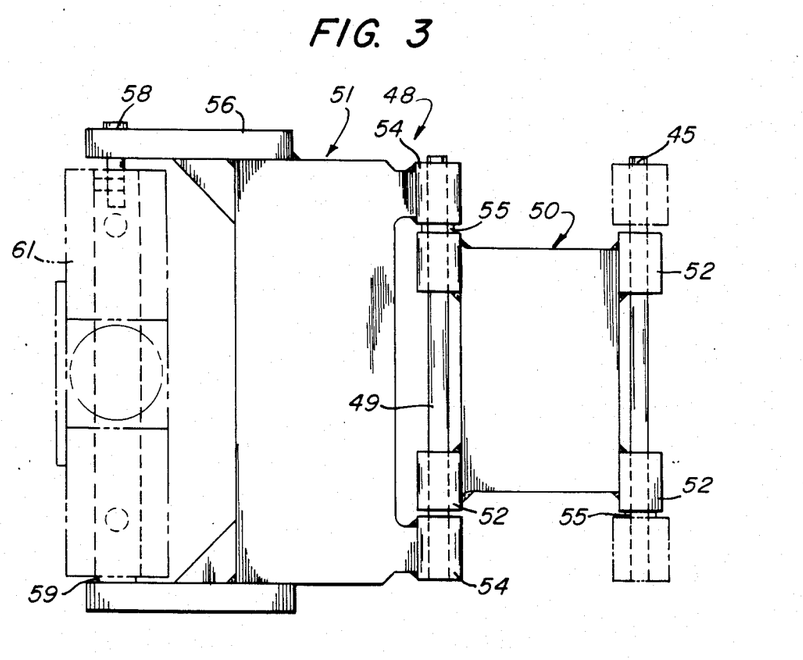
FIG. 3 is a side view showing certain elements of FIG. 1 in greater detail.
Figure 4:
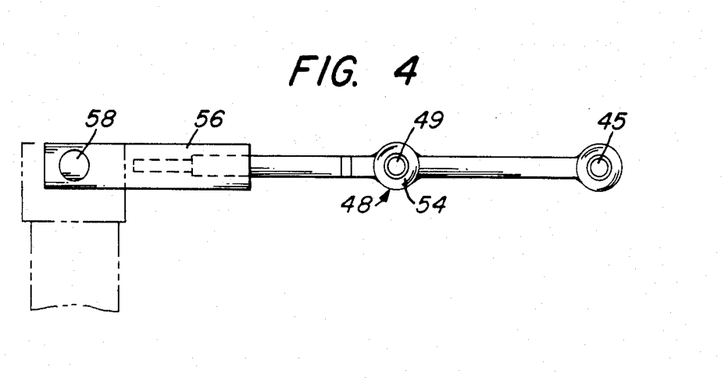
FIG. 4 is a plan view of the elements shown in FIG. 3.

With reference to FIGS. 3 and 4, the double swing arm assembly 48 is comprised of a first arm or plate 50 pivotally mounted to a second arm or plate 51 by means of a pin 49. The arm 50 is provided with a plurality of bosses 52, one at each corner of the arm 50. Each of the bosses 52 is provided with a bore. The bores in two of the bosses 52 are axially aligned and slidably received for pivotal movement on the pin 45. The bores through the other two bosses 52 are axially aligned and slidably received for pivotal movement on pin 49. The arm 51 is provided at one side with two bosses 54 having bores axially aligned to be slidably received and pivotal about the pin 49. The pins 45 and 49 may be secured against axial movement relative to the bosses of the arms 50 and 51 by conventional means, for example, a set screw provided through at least one of the bosses. A plurality of thrust washers 55 may also be provided between adjacent bosses to maintain the desired spacing and provide for smooth rotation of the arms 50 and 51 relative to the pins 45 and 49.

Plates 56 and 57 are respectively secured by welding at the upper and lower edges of swing arm 51 as viewed in FIG. 3 and provide a bracket pivotally supporting, by means of upper and lower pins 58 and 59, the support bar 61 of an additional chuck assembly for holding and extracting opposed elements of an assembly such as a drive shaft as described hereinabove.

Figure 5:
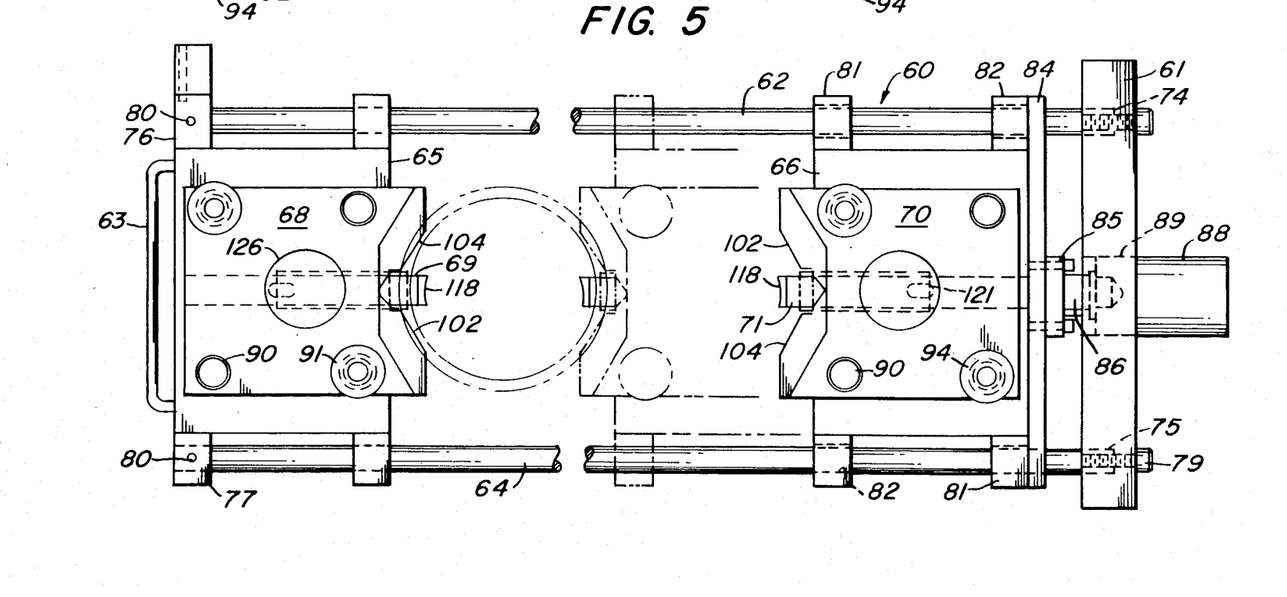
FIG. 5 is a front view of a sub-assembly of the apparatus shown by FIGS. 1 and 2.
Figure 6:
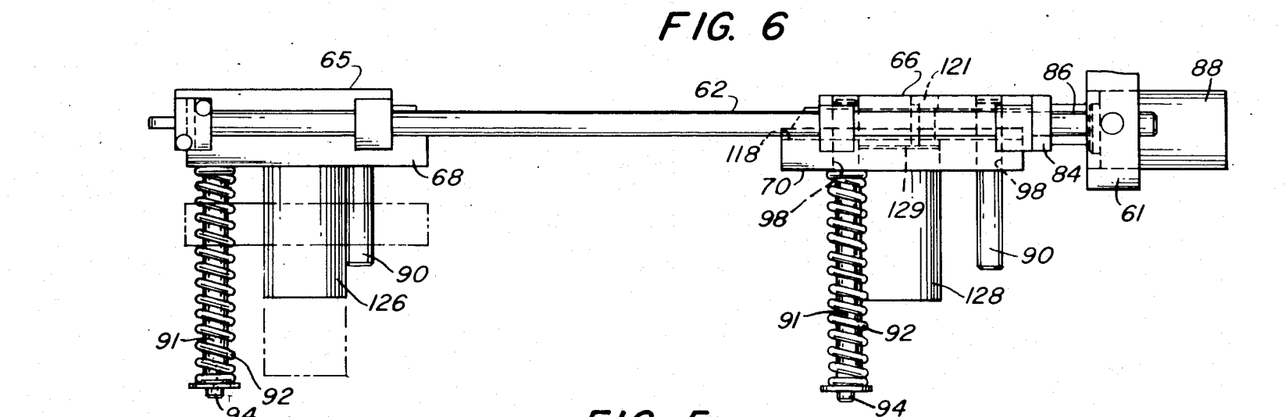
FIG. 6 is a plan view of the assembly of FIG. 5.

The additional chuck assembly 60, as best shown by FIGS. 5 and 6, is comprised of the support bar 61, a pair of rods 62 and 64, blocks 65 and 66, jaw plates 68 and 70 and fingers 69 and 71. The rods 62 and 64 are secured in spaced apart parallel relationship in bores 74 and 75 provided to the support bar 61 and bores respectively provided to boss 76 and boss 78 of block 65. The bore 75 in support bar 61 is counter sunk and one end of the rod 64 is secured therein by means of a cap screw 79. The other end of the rod 64 is secured in boss 77 of block 65 by means of a set screw 80 and the corresponding end of the rod 62 is secured in boss 76 of block 65 by another set screw 80.

Block 66 is provided with a plurality of bosses 81, one boss at each corner of the block and each of the bosses is provided with a bore 82 adapted to be slidably received upon one of the rods 62 or 64. A plate 84 secured by a plurality of cap screws to the right hand edge of block 66 as viewed in FIGS. 5 and 6 is connected at 85 to the piston 86 of a hydraulic cylinder 88 secured by means of a threaded connection at 89 to a bore provided to the support bar 61. The block 66 is thus mounted for sliding or reciprocating movement along the rods 62 and 64 under actuation of the hydraulic cylinder piston 86. The rods 62 and 64 thus serve as rails guiding reciprocating movement of the block 66 parallel to a plane defined by the longitudinal axes of the rods 62 and 64.

Jaw plates 68 and 70 are respectively mounted to blocks 65 and 66 for movement relative thereto. Blocks 65 and 66 are each provided with pairs of guide rods 90 and 91. The guide rods 90 and 91 are each respectively seated and welded to a bore 95 provided to the block 65 or 66 and project or extend normal to the surface of its respective guide block. Jaw plates 69 and 70 are each provided with four apertures 98 which are dimensioned and located to slidably receive the guide rods 90 and 91. The jaw plates 68 and 70 are thus slidably mounted on the guide rods 90 and 91 for movement relative to their respective blocks 65 and 66.

The guide rods 91 are longer than the guide rods 90. Each of the guide rods 91 mount a compression spring 92 seated at one end against the surface of a jaw plate 65 or 66 and at the other end against a cap screw and washer assembly 94 threaded to the other end of the guide rod 91. The springs 92 thus bias the jaw plates 68 and 70 into position adjacent their respective blocks 65 and 66.

Figure 8:
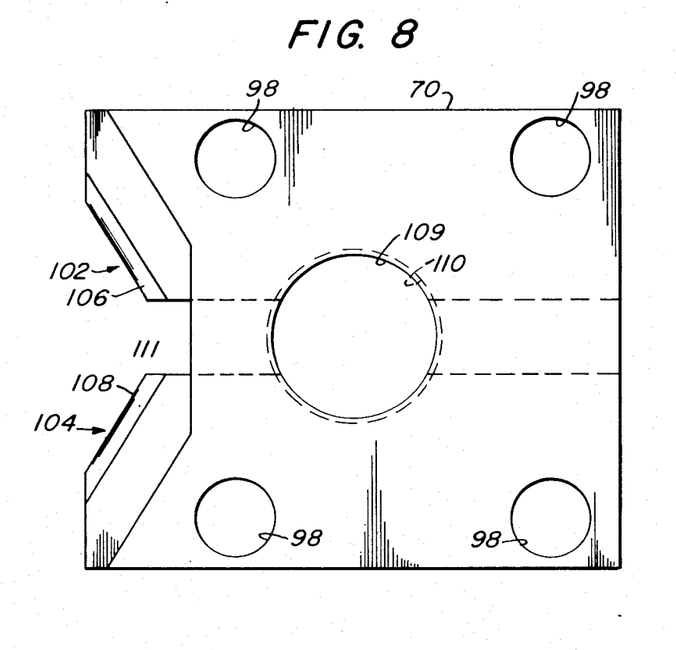
FIG. 8 is a front view of an element of the assembly of FIG. 5.
Figure 9:
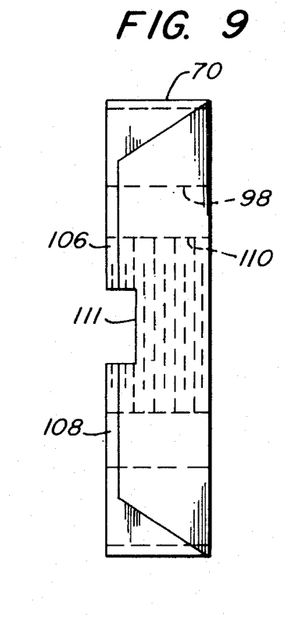
FIG. 9 is an end view of the element shown by FIG. 8.
Figure 10:
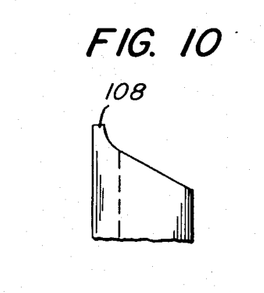
FIG. 10 is a partial view showing the end structure of the elements of FIGS. 8 and 9.

As shown by FIG. 8, one end of the jaw plate 70 is cut to provide a pair of obliquely disposed converging edges 102 and 104. The edges 102 and 104 converge at an angle of about 120° and are machined to respectively provide very narrow tips 106 and 108 preferably 0.20 inches or less in thickness as viewed in FIG. 10. As shown by FIGS. 8 and 9 a centrally located, relatively large diameter bore 109 is provided through the thickness of jaw plate 70 and threaded at 110 for a purpose which will be described more fully below. A recess or groove 111 is also provided across the width of jaw plate 70 as shown by FIG. 8. The recess 111 extends from the converging edges 102 and 104 through the bore 109 to the edge of the jaw plate opposite from the converging edges 102 and 104.

Jaw plate 68 includes the same elements as just described for jaw plate 70 and is identical in structure thereto, the only difference being that the jaw plate 68 is mounted in reverse or opposite hand relation to the jaw plate 70 in the additional chuck assembly 60.

The fingers 69 and 71 like the jaw plates 68 and 70 are also of identical structure with the finger 69 like the jaw plate 68 being mounted of opposite hand to the finger 71 in the additional chuck assembly 60. Accordingly, the structure of finger 71 will be described in detail with reference to FIGS. 11-13 with the understanding that the structure of finger 69 is identical thereto.

Figure 11:
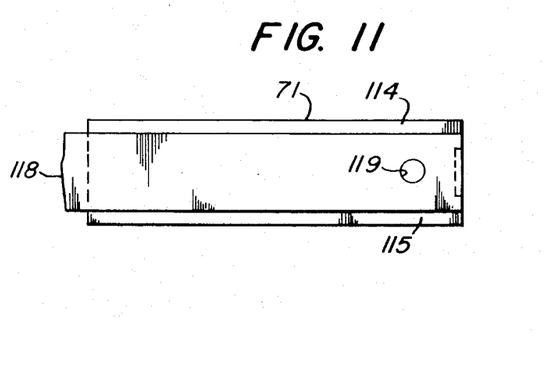
FIG. 11 is a front view of an additional element of the assembly of FIG. 5.
Figure 12:
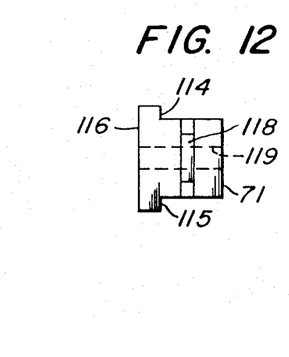
FIG. 12 is an end view of the element of FIG. 11.
Figure 13:
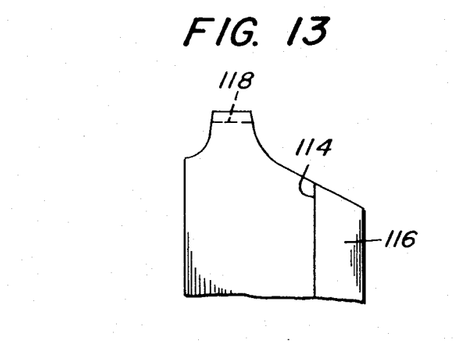
FIG. 13 is an enlarged partial view showing details of the shape at one end of the element of FIG. 11.

The finger 71 is an elongate element of generally rectangular cross-section having a pair of shoulders 114 and 115 forming a base 116 which extends substantially the length of the finger 71. One end of the finger 71 is cut away to form a relatively narrow rounded tip 118. The width of the tip 118 as shown by FIGS. 12 and 13 is very narrow, and like the jaw plate tips 106 and 108, preferably less than about 0.20 inches. A bore 119 is provided through the finger 71 adjacent the end opposite the tip 118.

Figure 7:
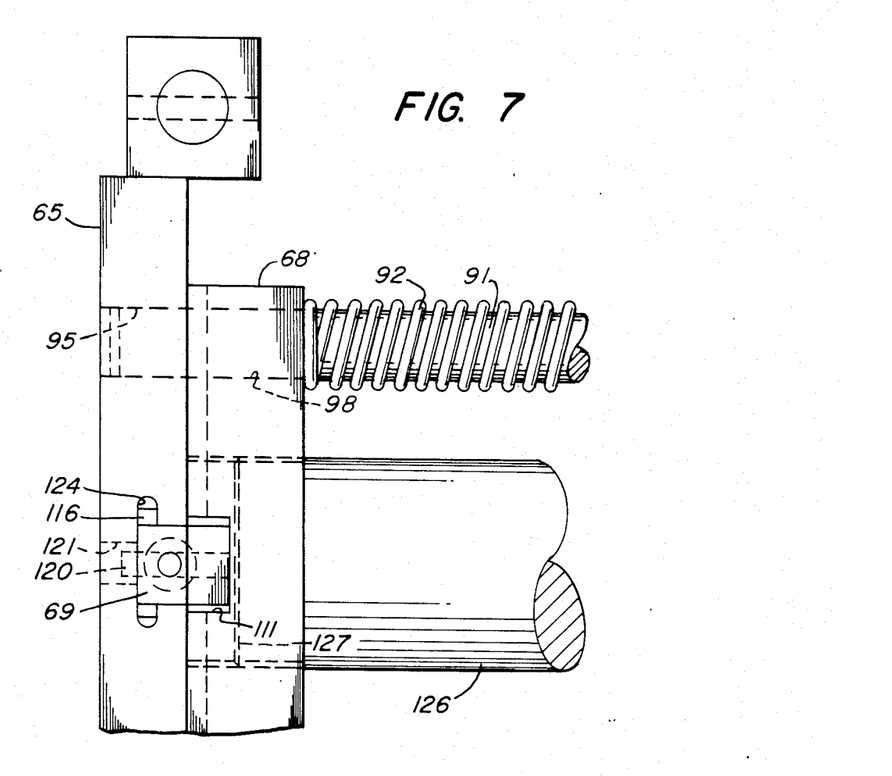
FIG. 7 is an enlarged partial end view in certain elements of the assembly of FIGS. 5 and 6 in greater detail.

The fingers 69 and 71 are mounted for sliding or reciprocating movement between their respective jaw plates 68, 70 and blocks 65, 66. With reference to FIG. 7 the finger 69 is partly located within the groove 111 provided to jaw plate 68 and the base 116 is slidably received within an undercut recess 124 provided to the block 65. A pin 120 is seated in the bore 119 provided to finger 69. The pin 120 is located in a slot 121 provided through the rear surface of the block 65 thereby restricting movement of the finger 69 in the groove 111 and undercut recess 124 to the length of the slot 121. The finger 69 is thus mounted for limited sliding movement in the slot 111 and undercut recess 124 while the pin 120 prevents the finger 69 from being withdrawn from either end of the assembly. The finger 71 is mounted in identical manner between a groove 111 provided to the jaw plate 70 and an under cut recess 124 provided to the block 66 for similar limited reciprocating movement. The tips 118 of the fingers 69 and 71 are formed to be in vertical alignment with the adjacent jaw plate tips 106 and 108 when the fingers 69 and 71 are assembled to the jaw plate grooves 111.

Hydraulic cylinders 126 and 128 are respectively threaded to the bores 109 of jaw plates 68 and 70. The hydraulic cylinders 126 and 128 are arranged with their pistons 127 and 129 acting directly upon the facing surfaces of block 65 and finger 69 and block 66 and finger 71. When fluid pressure is applied to the hydraulic cylinders 126 and 128 their pistons 127 and 129 seat against their respective blocks and fingers while the housings of hydraulic cylinders 126 and 128 move their respective jaw plates 69 and 70 along the guide rods 90 and 91 as shown in phantom, at the left side of FIG. 6. When fluid pressure is released from the cylinders 126 and 128, the biasing springs 92 provided on guide rods 91 move the jaw plates 68 and 70 back into abutment with their respective blocks 65 and 66.

The tips 106 and 108 of jaw plates 68 and 70 and the tips 118 of fingers 69 and 71 thus provide a plurality of jaws in the additional chuck assembly 60 for gripping and performing certain specified operations on a work piece located concentrically therebetween. For example, with reference to FIG. 5, actuation of hydraulic cylinder 88 will move its piston 86 and block 66 carrying jaw plate 70 and finger 71 to the left thereby locating the tips 102 and 104 of jaw plates 68 and 70 and tips 118 of fingers 69 and 71 in diametrically opposed concentric relationship with a tubular work piece as shown by phantom lines in FIG. 5.

The operation of the apparatus as it would be utilized to repair a tubular article, for example, an automotive drive shaft which may have been damaged or subject to excessive wear will now be described.

As received from the field, the drive shaft 25 having a yoke 26 press fit to the hollow interior of the drive shaft and secured by means of a circumferential weld joint 27 effected between the yoke and one end of the drive shaft is secured by the jaws 13 of multiple jaw chuck 14 with the yoke 26 positioned between the multiple jaw chuck 14 and the vise 34 and the other end of the drive shaft abutting the remote support plate 9. A cutting tool is secured to the tool fixture 38 and moved into position adjacent the weld joint 27. The motor 22 is activated by the switch 23 to rotate the multiple jaw chuck 14 and the drive shaft 25 while the cutting tool is continually advanced by means of the hand crank 41 to engage, cut and remove the weld material from joint 27. When the weld material has been removed from the joint 27, a small circumferential groove should remain between the yoke 26 and the adjacent end of the drive shaft 25. The cutting tool and tool fixture 38 are then withdrawn from the work area by operation of hand wheels 39 and 41.

The additional chuck assembly 60 is then moved into position adjacent the face of multiple jaw chuck 14. Although the auxiliary chuck assembly is a relatively heavy apparatus including a plurality of metal components and hydraulic cylinders, the double swing arm assembly 48 enables the operator to manually position the assembly 60 in the desired location as shown by phantom lines in FIG. 2 with relatively little effort. This is accomplished by grasping the D-shaped handle 63 provided to the outer edge of block 65, swinging the entire assembly until the block 65 passes in front of the yoke 26 and then pushing rearwardly until the tips 106 and 108 of jaw plate 68 are seated in the groove from which the weld material has been removed. The operator then moves lever 87 to actuate hydraulic cylinder 88 which, as shown by phantom lines in FIGS. 5, will move block 66, jaw plate 70 and finger 71 to the left until the tips 106 and 108 of jaw plate 70 engage the groove where the weld material has been removed from the other side of the drive shaft 25. The operator then checks to make certain that the tips 118 of fingers 69 and 71 are also positioned in the groove and if not, the fingers are moved manually into such engagement.

The hydraulic cylinders 126 and 128 are then actuated simultaneously by lever 125 to move the jaw plates 68 and 70 and their respective converging edges 102 and 104 away from their respective blocks 65, 66 and fingers 69, 71. The tips 106 and 108 of the converging edges 102 and 104 of the jaw plates 68 and 70 are engaged with the yoke 26 and withdraw the yoke from the interior of the drive shaft 25 as the tips 118 of the fingers 69 and 71 engage and secure the adjacent end of the drive shaft against movement with the yoke 26 as it is being withdrawn. The yoke 26 is then removed from the additional chuck assembly 60 and the assembly 60 is easily moved by the double swing arm assembly 48 out of the work area to the position shown by solid lines in FIG. 2.

A new or replacement yoke is fitted to the vise 34 and hydraulic cylinder 32 is actuated by lever 33 to press fit the stub of the replacement yoke to the interior of the tubular drive shaft 25. A circumferential weld joint is then effected between the yoke and the end of the drive shaft to secure the yoke in place. This may be accomplished by means of a welding torch or electrode carried by the tool fixture 38, or, if desired, the drive shaft and replacement yoke assembly may be removed to another work station where the weld would be effected around the joint between the replacement yoke and the adjacent end of the drive shaft.

The invention may also be embodied in other specific forms without departing from the spirit or essential characteristics thereof. The foregoing description is therefore to be considered as illustrative and not restrictive, the scope of the invention being defined by the appended claims, and all changes which come within the meaning and range of equivalency of the claims are therefore intended to be embraced thereby.

I claim:

1. Apparatus for machining and fitting one end of an elongated tubular workpiece comprising:

a frame, an elongate support bed and bearing means rotatably mounting a multiple jaw chuck for rotary movement around a horizontal axis, said bearing means being rigidly secured at one end of said support bed, means for rotating said chuck, a generally clyindrical workpiece passage concentric with said horizontal axis and extending through said chuck and said bearing means, a tool head supported by a stanchion at the other end of said support bed, said tool head being mounted for reciprocating movement along said horizontal axis, and a laterally moveable tool fixture mounted for movement along one horizontal edge of said support bed between said multiple jaw chuck and said stanchion whereby said multiple jaw chuck, said tool head and said tool fixture may be selectively actuated to operate on one end of a tubular workpiece supported by said chuck in said workpiece passage with said one end of said workpiece located on one side of said multiple jaw chuck between said multiple jaw chuck and said stanchion and the other end of said workpiece disposed on the other side of said multiple jaw chuck, and means mounted on the support bed for withdrawing elements previously fitted to said one end of said tubular workpiece, wherein said means for withdrawing elements previously fitted to said one end of said tubular workpiece includes an additional chuck assembly movably mounted to said support bed and movable means connected to the additional chuck assembly and to the support bed for moving the additional chuck assembly from a position disposed from said multiple jaw chuck to a position adjacent said multiple jaw chuck with the jaws of said additional chuck assembly concentric with said horizontal axis.

2. The apparatus defined by claim 1 wherein said tool head is fixed to a piston of a hydraulic cylinder supported by said stanchion.

3. The apparatus defined by claim 2 wherein said tool head is a vise adapted to support elements for insertion in said one end of said tubular workpiece.

4. The apparatus defined by claim 1 wherein said additional chuck assembly includes means for engaging said jaws of said additional chuck assembly with an element previously fitted to said one end of said tubular workpiece and means for moving said jaws of said additional clutch assembly and said element axially away from said one end of said tubular workpiece.

5. Apparatus for use in the manufacture and repair of tubular articles having elements fitted to the ends thereof comprising:

a frame, an elongate support bed and bearing means rotatably mounting a multiple jaw chuck for rotary movement around a horizontal axis, said bearing means being rigidly secured at one end of said support bed, means for rotating said chuck, a generally cylindrical workpiece passage concentric with said horizontal axis and extending through said chuck and said bearing means, a pedestal remote from said frame and mounting workpiece support means axially aligned with said chuck, means rigidly connecting said remote article support means to said frame, and a plurality of devices mounted to said support bed and movable relative to said support bed for selectively effecting operations on one end of a tubular workpiece supported by said multiple jaw chuck with the other end of said tubular workpiece supported by said workpiece support means mounted to said pedestal, wherein said plurality of devices include means mounted on the support bed for withdrawing an element previously fitted at one end of a tubular article supported by said multiple jaw chuck, and wherein said means for withdrawing an element includes an additional chuck assembly movably mounted to said support bed and movable means connected to the support bed and to the additional chuck assembly for moving the additional chuck assembly from a position displaced from said multiple jaw chuck to a position locating the jaws of said additional chuck assembly adjacent said multiple jaw chuck with the jaws of said additional chuck assembly concentric with said horizontal axis.

6. The apparatus defined by claim 5 wherein said plurality of devices include a tool head mounted for reciprocating movement along said horizontal axis and supported at the end of said support bed opposite from said multiple jaw chuck.

7. The apparatus defined by claim 6 wherein said tool head is a vise secured to the piston of a hydraulic cylinder supported by a stanchion at said end of said support bed.

8. The apparatus defined by claim 5 wherein said plurality of devices include a laterally movable tool fixture mounted for movement along one horizontal edge of said support bed.

9. The apparatus defined by claim 8 wherein said laterally movable tool fixture is a fixture for supporting a cutting tool.

10. The apparatus defined by claim 5 wherein said additional chuck assembly includes means for engaging said jaws of said additional clutch assembly with an element previously fitted to one end of a tubular article and means for moving said jaws of said additional chuck assembly and said element axially away from said multiple jaw clutch and said one end of said tubular article.

* * * * *